(12) United States Patent
Kamolvathin et al.

(10) Patent No.: US 8,968,578 B1
(45) Date of Patent: Mar. 3, 2015

(54) WATER TREATMENT SYSTEM AND METHOD

(71) Applicants: Richard D. Kamolvathin, Sioux Falls, SD (US); Matthew L. Lammers, Sioux Falls, SD (US); Aaron W. Mach, Sioux Falls, SD (US)

(72) Inventors: Richard D. Kamolvathin, Sioux Falls, SD (US); Matthew L. Lammers, Sioux Falls, SD (US); Aaron W. Mach, Sioux Falls, SD (US)

(73) Assignee: Verity Farms LLC, Sioux Falls, SD (US)

( * ) Notice: Subject to any disclaimer, the term of this patent is extended or adjusted under 35 U.S.C. 154(b) by 0 days.

(21) Appl. No.: 13/782,543

(22) Filed: Mar. 1, 2013

Related U.S. Application Data

(60) Provisional application No. 61/606,059, filed on Mar. 2, 2012.

(51) Int. Cl.
*C02F 1/32* (2006.01)
*C02F 3/00* (2006.01)

(52) U.S. Cl.
CPC .......................................... *C02F 3/00* (2013.01)
USPC ................................ 210/748.11; 210/170.01

(58) Field of Classification Search
USPC .......................................... 210/748.11, 170.01
See application file for complete search history.

(56) References Cited

U.S. PATENT DOCUMENTS

| | | | | |
|---|---|---|---|---|
| 4,769,131 A | * | 9/1988 | Noll et al. | 210/85 |
| 4,968,437 A | * | 11/1990 | Noll et al. | 210/748.1 |
| 5,069,885 A | * | 12/1991 | Ritchie | 422/186 |
| 5,149,888 A | * | 9/1992 | Costantini et al. | 568/771 |
| 7,595,003 B2 | * | 9/2009 | Maddox | 210/748.03 |
| 7,695,675 B2 | * | 4/2010 | Kaiser et al. | 422/24 |
| 8,552,399 B2 | * | 10/2013 | Tanaka et al. | 250/436 |
| 8,658,035 B2 | * | 2/2014 | Barry et al. | 210/243 |
| 2003/0209501 A1 | * | 11/2003 | Leung | 210/748 |
| 2004/0140269 A1 | * | 7/2004 | Chang | 210/748 |
| 2006/0021942 A1 | * | 2/2006 | Bradley | 210/663 |
| 2006/0163170 A1 | * | 7/2006 | Eguchi | 210/748 |
| 2008/0206095 A1 | * | 8/2008 | Duthie | 422/24 |
| 2009/0145855 A1 | * | 6/2009 | Day et al. | 210/748 |
| 2012/0228236 A1 | * | 9/2012 | Hawkins et al. | 210/748.14 |
| 2013/0008857 A1 | * | 1/2013 | Foster | 210/748.16 |

FOREIGN PATENT DOCUMENTS

WO WO 2011114164 A1 * 9/2011

* cited by examiner

*Primary Examiner* — Chester Barry
(74) *Attorney, Agent, or Firm* — Jeffrey A. Proehl; Woods, Fuller, Shultz & Smith, PC

(57) ABSTRACT

A method of treating water may comprise receiving water through an intake of a water treatment system, treating the water to neutralize contaminants, structuring the water by passing the water flow through a water structuring assembly and a plurality of structuring objects, injecting at least one biological component into the water passing through the water treatment system, and passing the water through an outlet of the water treatment system. A water treatment system may comprise a pump configured to move water between an intake and an outlet, a water pretreatment assembly configured to remove particles from the water, a water treatment assembly configured to neutralize contaminants in the water, a water structuring assembly having an entry and an exit and configured to passing the water flow about a plurality of structuring objects, and an injection apparatus configured to inject at least one biological component into the water.

16 Claims, 10 Drawing Sheets

```
┌─────────────────────────────────────────┐
│   ADD BENEFICIAL BIOLOGICAL COMPONENTS  │
└─────────────────────────────────────────┘
                    │
                    ▼
┌─────────────────────────────────────────┐
│      RECEIVE TREATED WATER INTO         │
│      WATER STRUCTURING ASSEMBLY         │
└─────────────────────────────────────────┘
                    │
                    ▼
┌─────────────────────────────────────────┐
│       INJECT BIOLOGICAL COMPONENTS      │
│            INTO WATER FLOW              │
└─────────────────────────────────────────┘
                    │
                    ▼
┌─────────────────────────────────────────┐
│       PASS WATER TO OUTLET OF SYSTEM    │
└─────────────────────────────────────────┘
```

*Fig. 5*

WATER TREATMENT SYSTEM AND METHOD

REFERENCE TO RELATED APPLICATIONS

This application claims the benefit of U.S. Provisional Patent Application No. 61/606,059 filed Mar. 2, 2012, the contents of which is incorporated by reference in its entirety.

BACKGROUND

Field

The present disclosure relates to water treatment and purification apparatus and more particularly pertains to a new water treatment system and method for providing better quality water in a variety of applications.

SUMMARY

The present disclosure relates to a water treatment system and method may utilize various aspects of filtering, sterilization and clarification, and structuring to produce cleaner and healthier water.

In one aspect, the disclosure relates to a method of treating water which may comprise receiving water through an intake of a water treatment system, treating the water to neutralize contaminants, structuring the water by passing the water flow through a water structuring assembly and a plurality of structuring objects, injecting at least one biological component into the water passing through the water treatment system, and passing the water through an outlet of the water treatment system.

In another aspect, the disclosure relates to a water treatment system with an intake and an outlet. The system may comprise a pump configured to move water between the intake and the outlet, a water pretreatment assembly configured to remove particles from the water, and a water treatment assembly configured to neutralize contaminants in the water. The system may also comprise a water structuring assembly having an entry and an exit and configured to pass the water flow about a plurality of structuring objects, and an injection apparatus configured to inject at least one biological component into the water.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, as well as the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 5 is a schematic flow diagram of another aspect of the method, according to an illustrative implementation.

DETAILED DESCRIPTION

Figure 1:
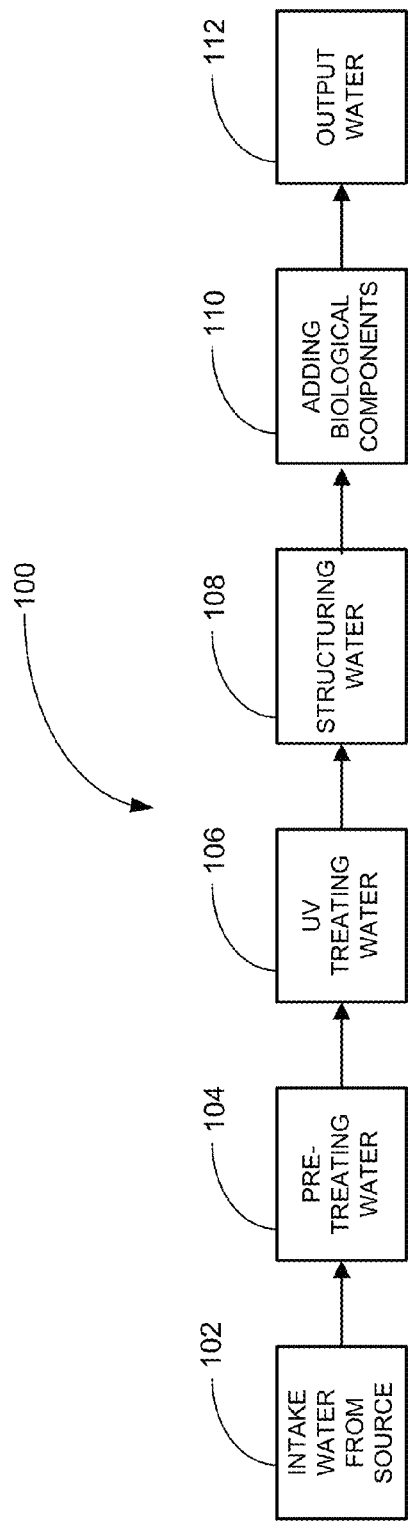
FIG. 1 is a schematic flow diagram of aspects of the method of the new water treatment system and method according to the present disclosure.
Figure 2:
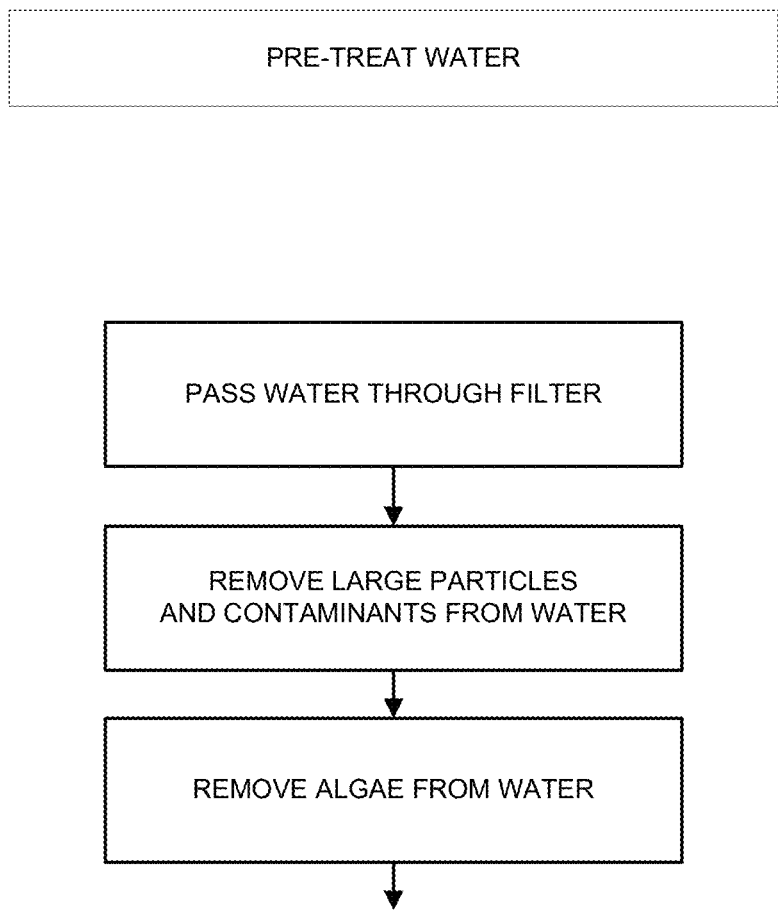
FIG. 2 is a schematic flow diagram of the one aspect of the method, according to an illustrative implementation.
Figure 3:
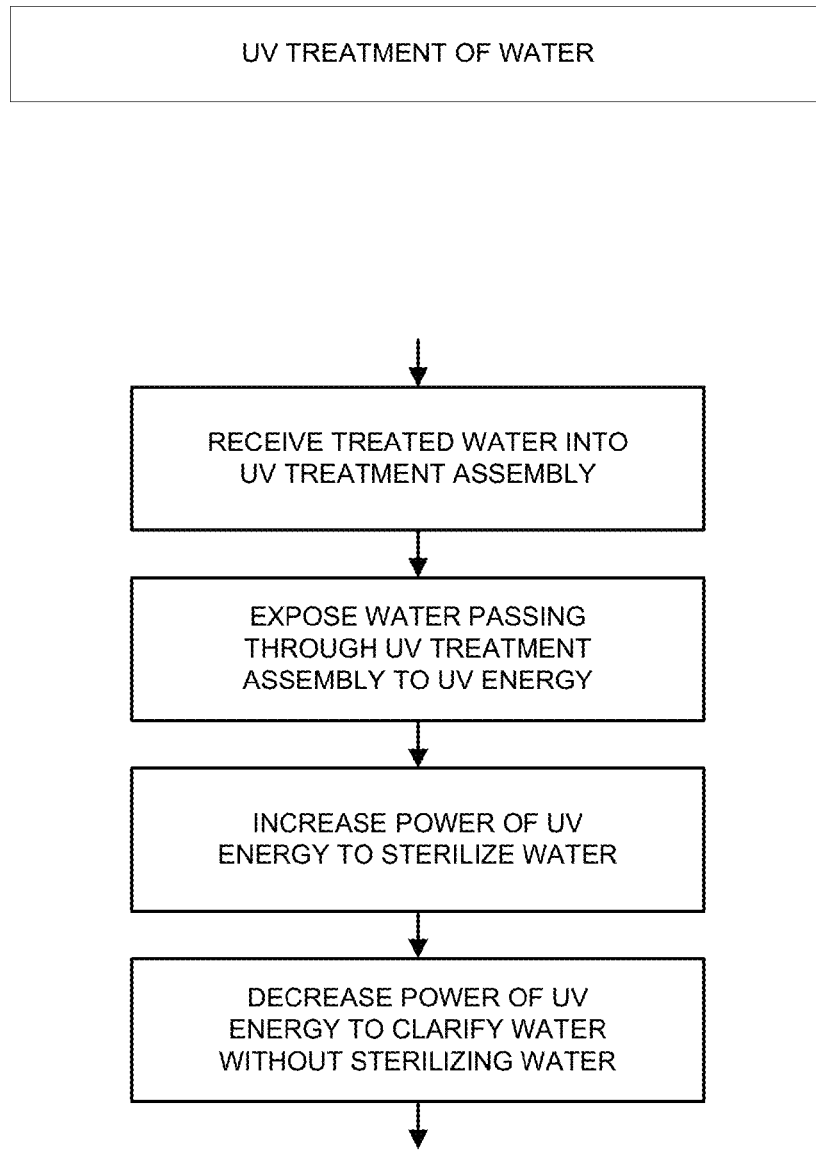
FIG. 3 is a schematic flow diagram of another aspect of the method, according to an illustrative implementation.
Figure 4:
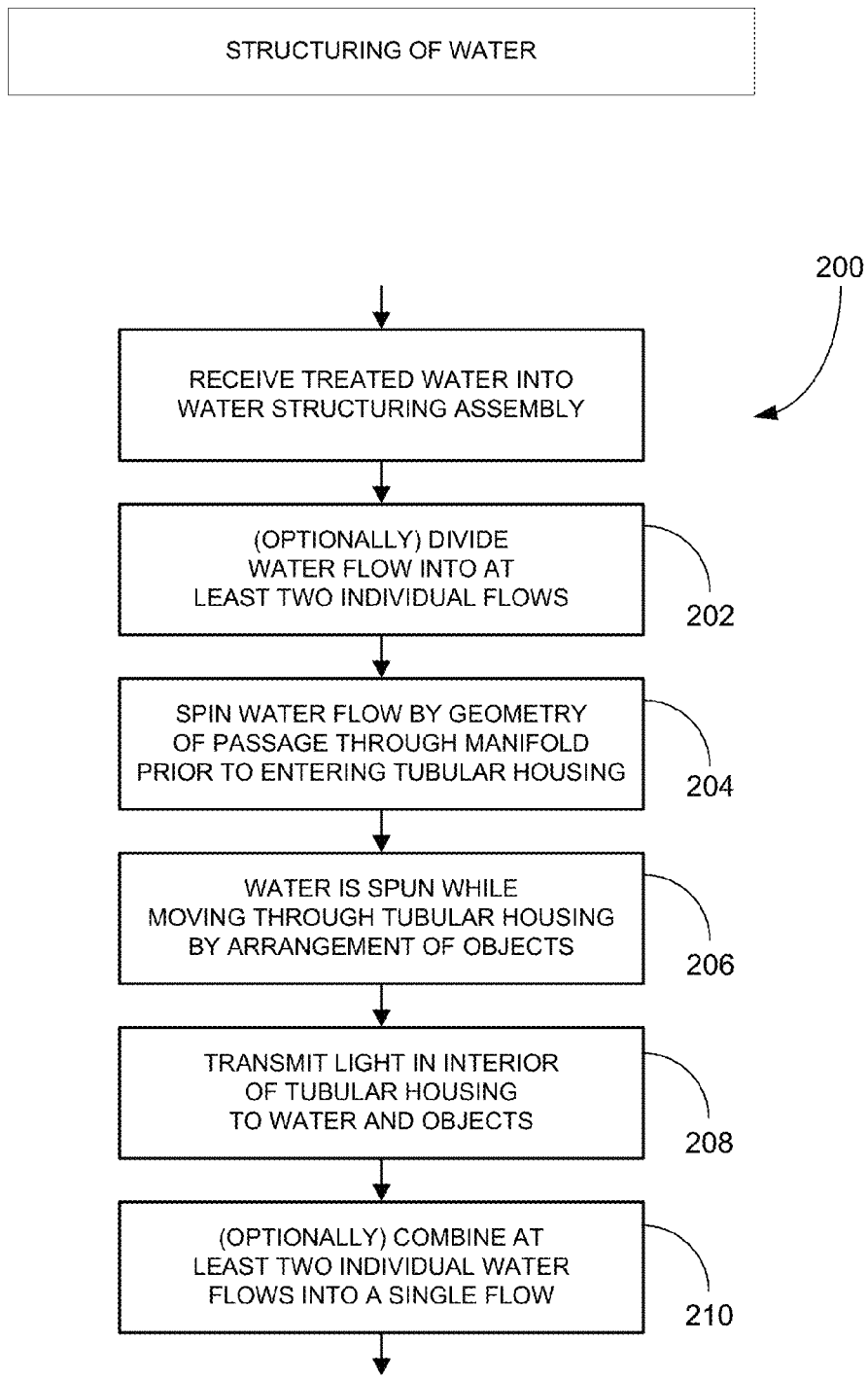
FIG. 4 is a schematic flow diagram of another aspect of the method, according to an illustrative implementation.
Figure 6:
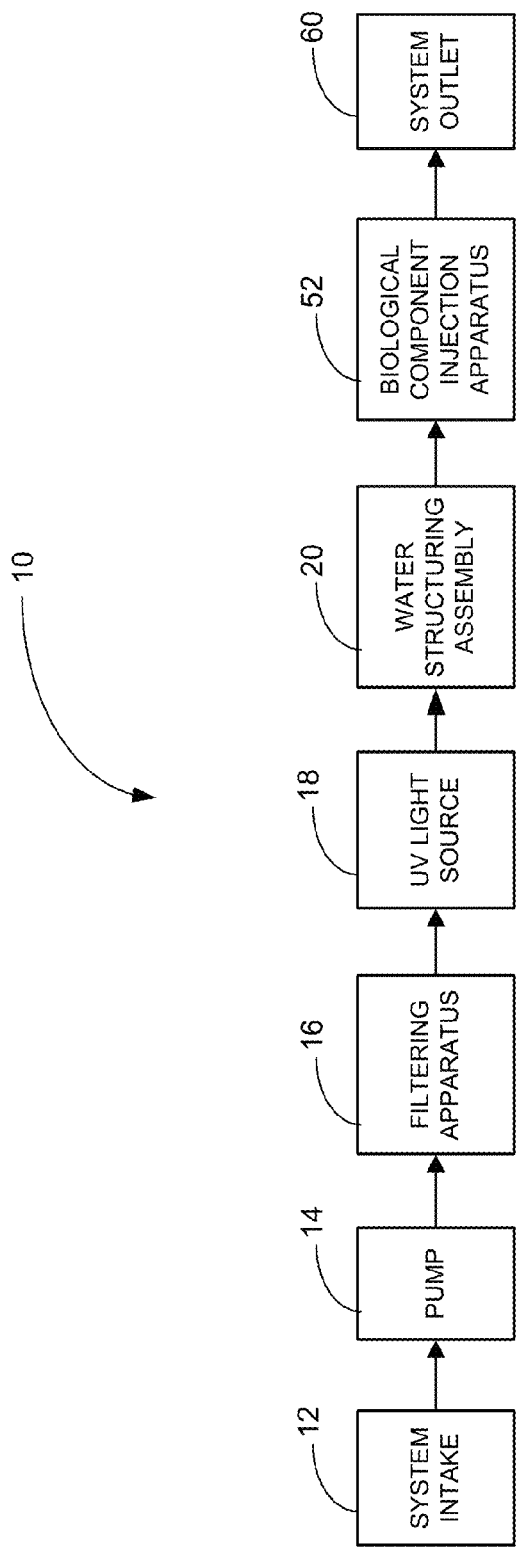
FIG. 6 is a schematic diagram of an illustrative embodiment of the water treatment system.
Figure 7:
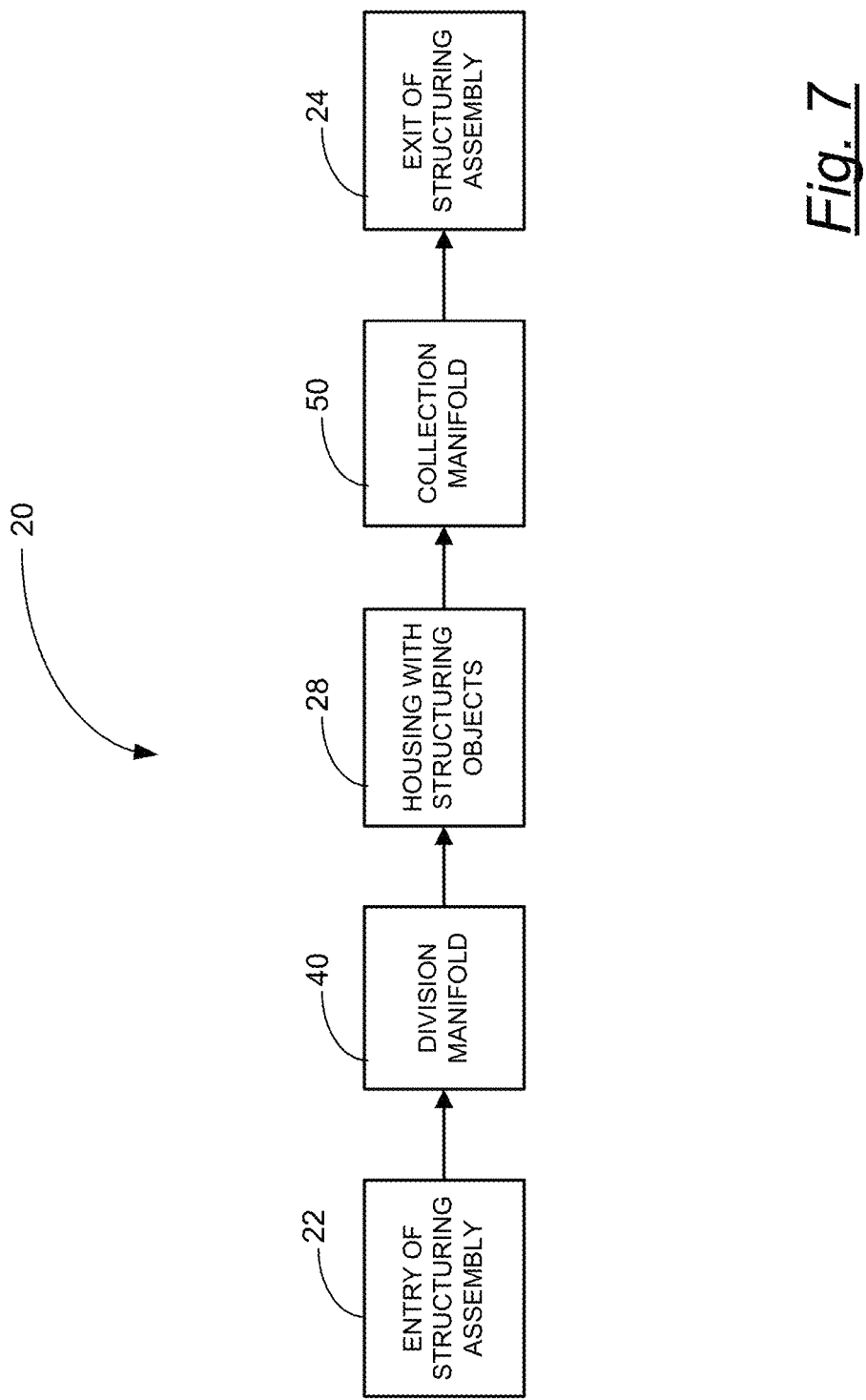
FIG. 7 is a schematic diagram of an aspect of the system shown in greater detail.
Figure 8:
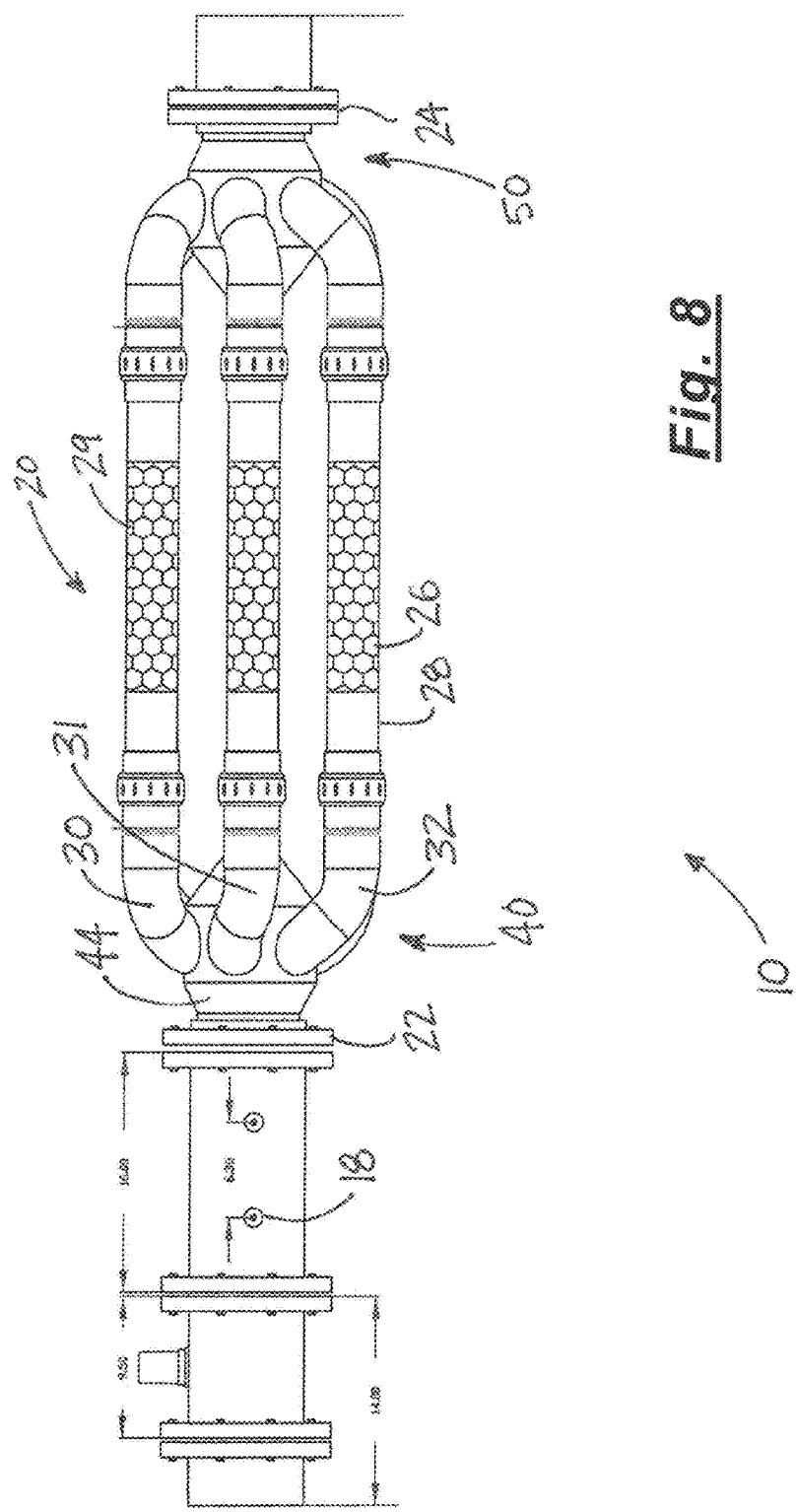
FIG. 8 is a schematic side view of a portion of the system, according to an illustrative embodiment.
Figure 10:
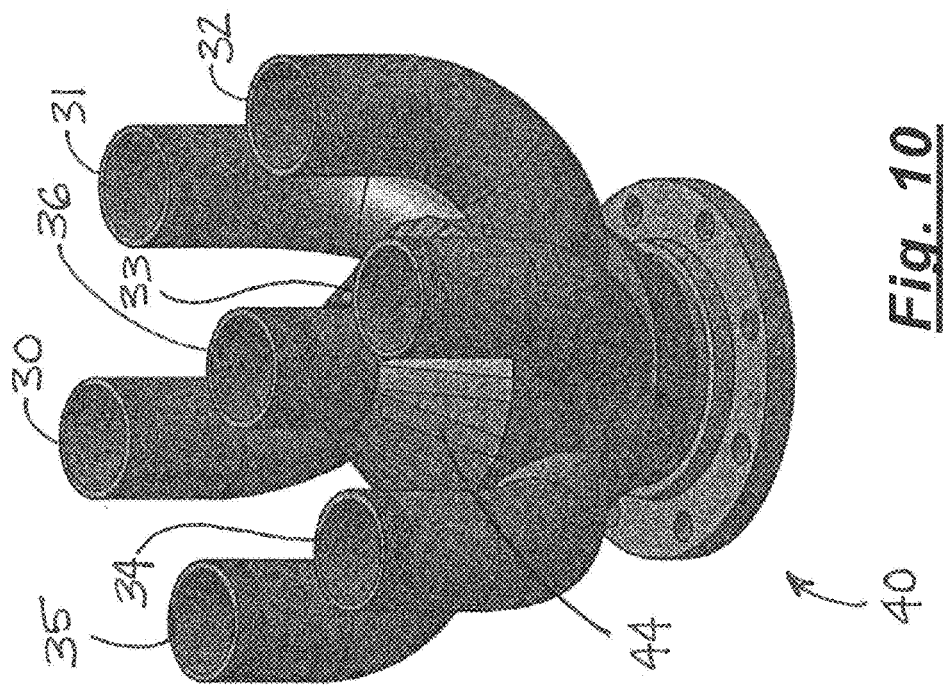
FIG. 10 is a schematic perspective view of a manifold of the system, according to an illustrative embodiment.
Figure 9:
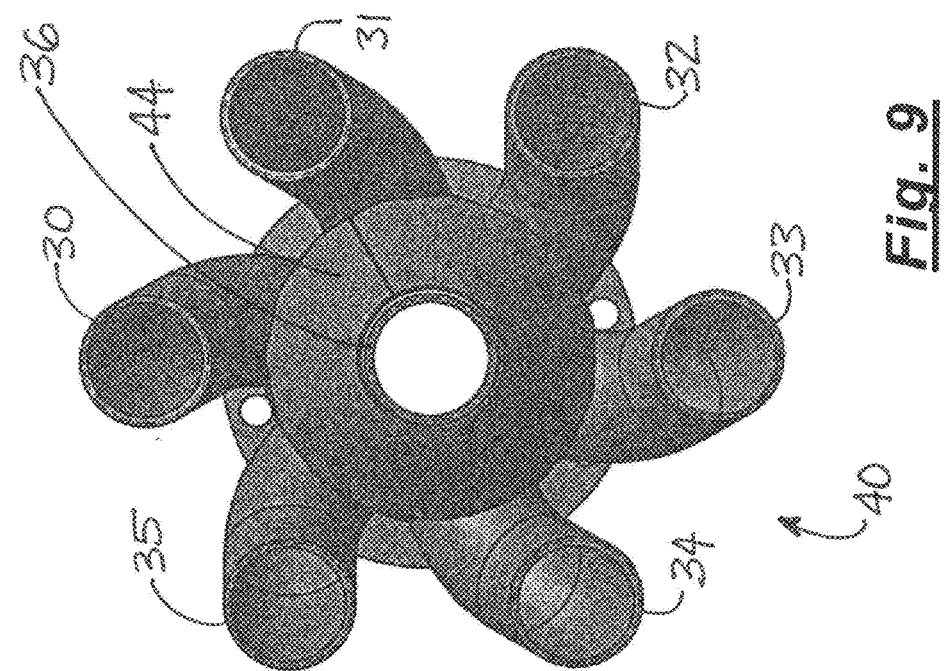
FIG. 9 is a schematic end view of a manifold of the system, according to an illustrative embodiment.

With reference now to the drawings, and in particular to FIGS. 1 through 11 thereof, a new water treatment system and method embodying the principles and concepts of the disclosed subject matter will be described.

Applicant has recognized that a highly effective water treatment system and method may incorporate aspects of mechanical filtration, sterilization, clarification, as well as revitalization of water and biological filtration.

In one aspect of the disclosure, a method 100 of treating water will be described. Although the method and system may be used with fluids other than water, the description will refer to the fluid as water with the understanding that other fluids may be used rather than water.

The method may include, as an initial or preliminary step, receiving water through an intake 12 of a water treatment system 10 (block 102), and may include creating a water flow through the water treatment system, such as by utilizing a pump 14. In some implementations, moving water into the inlet 12 and through the system 10 may include drawing the water from a body of water, such as a natural body of water such as a pond or lake, although drawing the water from a naturally moving flow of water, such as from a stream or river, may also be utilized. It should also be recognized that the water may be drawn from other sources such as tanks, man made reservoirs, and other confinement structures.

The method 100 may further include pre-treating the water received through the intake (block 104). Pre-treating the water may include removing particles and other contaminants from the water, such as those particles that can be removed by filtering the water by moving the water through a filtering apparatus 16. The pre-treatment filtering may remove larger particles from the water. The pre-treating may function to remove, for example, algae from the water. Significantly, the recovered algae may be used for purposes such as fertilizing fields and even production of biofuels, among other uses.

The method 100 may further comprise treating the water to remove or neutralize contaminants (block 106). In many of the most preferred implementations, treating the water includes exposing the water to ultraviolet (UV) light radiation by passing the water flow through UV light radiation produced by a UV light source 18. The UV radiation treatment does not alter the chemistry of the water, and does not add anything to the water except the energy of the UV radiation. The UV light radiation tends to incapacitate microorganisms existing in the water by sterilizing cells of the microorganisms. Illustratively, the UV energy may penetrate the outer cell membrane of the cells, pass through the cell body and disrupt the DNA of the cell preventing reproduction. The sterilized microorganisms may not necessarily be removed from the water, and the UV disinfection may not remove dissolved organic materials, inorganic materials or particles in the water.

Generally, the nature of the contaminants sterilized or neutralized using the UV light radiation may be changed by adjusting the power or intensity of the UV light radiation. For example, increasing the power or intensity of the UV light radiation may tend to provide a relatively greater degree of sterilization of the water, while decreasing the power or intensity of the UV light radiation may tend to clarify the water with a relatively lesser degree of sterilizing effect. The degree of inactivation by UV radiation may be directly related to the UV dose applied to the water. The dosage, which is a product of the UV light intensity and the UV light exposure time of the water, may be measured in microwatt per second per square centimeter. The system 10 may employ a UV light source that produces a UV light spectrum in a range of wavelengths, and in one illustrative embodiment have a wavelength of approximately 254 nm, which is believed to be an optimal wavelength for providing disinfection, sterilization and clarification. The UV light source may not be in contact with the water in the flow, and the light source may be housed in a quartz glass sleeve that is positioned inside a chamber through which the water flows through UV transparent tubes formed of Polytetrafluoroethylene (PTFE). In some embodiments, the UV source is a suitable low-pressure mercury vapor lamp, although other sources may be utilized.

The method 100 may also include structuring the water to restore the character of the water (block 108), which may be accomplished by passing the water flow through a water structuring assembly 20 having an entry 22 and an exit 24. The structuring of the water may include passing the water flow about a plurality of structuring objects 26. The structuring objects 26 may have an exterior surface that is curved or rounded, and in some of the most preferred implementations are substantially spherical in shape. The objects may be formed of a translucent or transparent material to transmit light therethrough, and may be formed of a glass material.

Additionally, the structuring objects 26 may be positioned in a housing 28 that may have a tubular form through which the water flows. The tubular housing 28 may have an interior lumen 29 in which the objects 26 are positioned, and in some of the most preferred embodiments the interior lumen may be defined by a surface that is substantially cylindrical in shape. The tubular housing may have a first end and a second end.

The peripheral wall that forms at least a portion of the tubular housing may be translucent or transparent to light of at least some selected frequencies so that light can be transmitted through the perimeter wall from the exterior of the tubular housing into the interior lumen, and reach the objects 26 positioned in the lumen.

The step of structuring the water may include additional steps 200 that may comprise dividing the flow of water into at least two separate flows along at least two separate flow paths 30 (block 202). The separation of the flow into smaller flows may facilitate imparting a spin or rotation to the water as the water flow into the tubular housing 28, as well as facilitating exposure of the water and the objects 26 to light energy. Some preferred embodiments may include dividing the flow into four to eight separate flows. In the illustrative embodiment, the flow is divided into six separate flows along separate flow paths 30, 31, 32, 33, 34, and 35. As a further option, a bypass flow along a bypass flow path 36 may be provided in which the flow of water is permitted to bypass the structuring objects during times when the structuring function is not desired.

A significant aspect of the dividing of the water flow into separate flow paths may be the imparting of a spiral flow pattern to the water along the flow paths (block 204). This spiral flow pattern may be imparted by passing the flows through a structure that causes the spiral flow pattern, and in some of the most preferred embodiments, the structure comprises a division manifold 40 that is configured to impart a spiral flow pattern in the flows that are passing through separate passages 42 of the manifold. The passages 42 of the manifold may radiate from a central chamber 44 in a curved or spiraling manner.

In some embodiments, the structuring objects 26 may be arranged in the lumen 29 in a manner that tends to further create a spiral flow of the water in the interior lumen (block 206). Illustratively, the objects 26 may have the aforementioned substantially spherical shape and be arranged in a triple helical arrangement, or an arrangement of three interlaced helixes, which helps to create spiral water flow.

The step of structuring the water may also include exposing the structuring objects 26 to light (block 208), which may occur while the water is flowing about the structuring objects 26 in the housing 28. The light may be passed through the perimeter wall of the tubular housing to the objects 26. The exposure of the objects 26 to light may include transmitting light of a plurality of frequencies onto the structuring objects. The light frequencies may cover substantially the full light spectrum, and may have temperatures of approximately 5000 K to approximately 10000 K.

The step of structuring the water may also include collecting the water from the separate flows and flow paths into a single flow (block 210) which may be performed after the structuring of the water. The collection of the water may be performed using a collection manifold 50 that may be a mirror image of the division manifold 40, although this is not critical.

The method may also include the addition of beneficial biological components after the filtering and structuring of the water (block 110). The addition of the components may be performed by a suitable injection apparatus 52 that injects the components into the flow of the water. The biological components may comprise non toxic and organic components. The components may include disease-suppressing micro-organisms, and each of these micro-organisms may have a specific function or task, and may function together with some micro-biotic synergy. In the most preferred implementations, the components naturally exist and are not modified or manipulated. Some of the components may be known to produce bioactive substances such as vitamins, enzymes, antioxidants, and probiotics that can directly, or indirectly, enhance plant protein growth and protection.

In some implementations, the components include microorganisms from one or more groups. One group of the microorganisms may comprise lactic acid bacteria which may have strong sterilizing properties, and may suppress harmful micro-organisms and encourage quick breakdown of organic substances. In addition, the lactic acid bacteria can suppress the reproduction of Fasarium, which is a harmful fungus. Another group of the microorganisms may comprise yeasts which may manufacture anti-microbial substances useful for plant growth. Metabolites of the yeast may provide food for other bacteria such as lactic acid and actinomycete groups. Still another group of the microorganisms may comprise acinomycetes that may suppress harmful fungi and bacteria and can coexist with photosynthetic bacteria. Yet another group of the microorganisms may comprise photosynthetic bacteria which may perform a leading role of the components by synthesizing useful substances from secretions of roots, organic matter and harmful gasses (for example, hydrogen sulphide) by using sunlight and the heat of soil as sources of energy, and thus may contribute to better use of sunlight or better photo synthesis. The metabolites of the photosynthetic bacteria may be directly absorbed by plants. In addition, the photosynthetic bacteria may function to increase the number of other bacteria and act as nitrogen binders. Still yet another group of the microorganisms may comprise fungi that may bring about fermentation to break down organic substances more quickly, which can suppress smell and prevent damage that could be caused by harmful organic feeders.

Preferably, but not critically, the components are not genetically-engineered or modified (GMO) nor chemically synthesized, and are not a drug or a fertilizer per se.

The water may then be passed through an outlet 60 of the water treatment system 10 (block 112), and in some implementations may include returning the water to the body of water from which water was originally drawn and passed into the system 10. In this way, the condition of the water in a body of water can be improved significantly.

While some embodiments of the system 10 may be powered using relatively conventional power supplies such as utility supplied electrical power, other embodiments of the system 10 may utilize less conventional power sources that are more portable and may be utilized in areas or regions where utility-supplied power is not readily available. Such power sources may be highly useful in those implementations where the fluid to be treated, such as a body of water, is relatively remote or the use of more conventional power sources for a relatively short time does not justify extending conventional power lines to the location of the system. Further, some embodiments may utilize power supplies that are able to utilize renewable power that does not have to be replenished, such as an electrical power generator operating on fuel would have to be refueled. Examples of suitable renewable power sources include solar energy and wind energy, which may be provided, for example, by solar energy panels and windmills or turbines.

Figure 11:
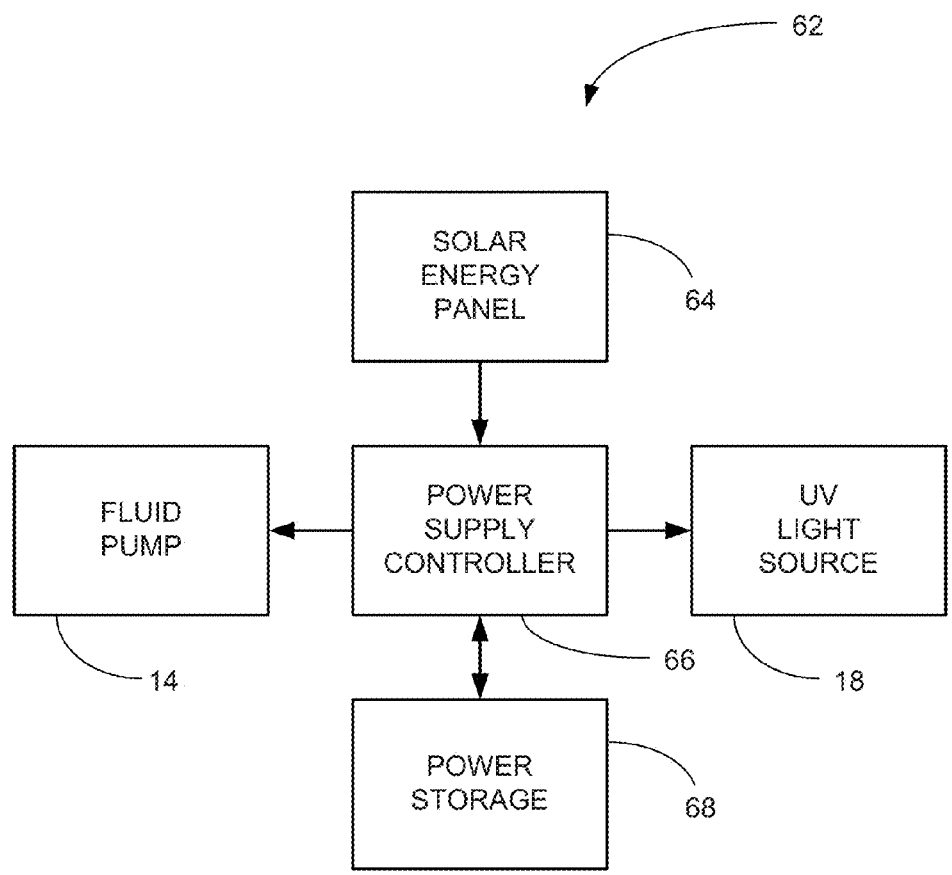
FIG. 11 is a schematic diagram of a power circuit for elements of an embodiment of the system.

As illustratively depicted in FIG. 11, the power system 62 providing the source of power for the system may include a solar energy panel 64 (or multiple panels) exposed to environmental light that allows the panel to generate electrical energy that is provided, for example, to the pump 14 acting to move the fluid through the system 10 and along the flow path. Additionally, in some implementations, the solar energy panel 64 may also provide power for the UV light source 18. Additional elements of the system 10 may also be powered by the power system. Other components may be included in the power system 62 that facilitate operation of the system 62, including a power supply controller 66 that controls the supply of power from the sources to the pump 14 and light source 18 as well as other elements of the system 10 that might utilize electrical power. Further, the power system 62 may also include means for storage of power from the time of generation of the power to the time that the power is utilized. In the illustrative embodiment, the power storage 68 is provided by a rechargeable battery that is selectively charged by the solar panel or may even be charged by other sources prior to movement of the system 10 to the site of the body of water.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A method of treating water, comprising:
   receiving water through an intake of a water treatment system;
   treating the water to neutralize contaminants;
   structuring the water by passing the water flow through a water structuring assembly including at least one tube and a plurality of structuring objects positioned in the tube such that water flowing in the tube passes around the structuring objects;
   injecting at least one biological component into the water passing through the water treatment system; and
   passing the water through an outlet of the water treatment system;
   wherein structuring the water includes imparting a spiral flow pattern to the water flowing within the tube; and
   wherein imparting a spiral flow includes passing the water through a manifold configured to impart a spiral flow pattern.

2. The method of claim 1 wherein structuring the water includes dividing the flow of water into at least two separate flows.

3. The method of claim 1 wherein imparting a spiral flow includes passing each of the separate flows through a separate passage of the manifold.

4. The method of claim 1 wherein structuring the water includes exposing the water and the structuring objects to light.

5. The method of claim 4 wherein exposing the water and the structuring objects to light includes transmitting light of a plurality of frequencies into the structuring objects.

6. The method of claim 1 wherein receiving water through the intake includes taking water from a natural body of water, and passing the water through the outlet includes returning the water to the same natural body of water.

7. The method of claim 1 wherein receiving water into the water treatment system includes creating a continuous flow of water between the intake and outlet of the water treatment system.

8. The method of claim 1 additionally comprising pretreating the water received through the intake to remove particles from the water.

9. The method of claim 8 wherein pretreating the water includes filtering the water.

10. The method of claim 1 wherein treating the water to remove contaminants includes including exposing the water to ultraviolet (UV) light radiation.

11. A water treatment system with an intake and an outlet, the system comprising:

a pump configured to create a water flow between the intake and the outlet;

a water pretreatment assembly configured to remove particles from the water flow;

a water treatment assembly configured to neutralize contaminants in the water flow;

a water structuring assembly having an entry and an exit and configured to pass the water flow about a plurality of structuring objects; and an injection apparatus configured to inject at least one biological component into the water;

wherein the water structuring assembly includes a tube through which the water flow passes, the structuring objects being substantially spherical and positioned in the tube such that the water flow passes about the structuring objects;

wherein the water structuring assembly is configured to impart a spiral flow pattern to the water moving about the structuring objects in the tube; and wherein the water structuring assembly includes a manifold configured to divide the water flow into at least two separate flows through a different said tube and impart a spiral flow pattern to the water flow in each said tube, each of the separate flows having a separate passage in the manifold.

12. The system of claim 11 wherein the water structuring assembly is configured to divide the flow of water into at least two separate flows, each of the flows passing through a different said tube.

13. The system of claim 11 wherein the water structuring assembly including a light source configured to expose the water and the structuring objects to light.

14. The system of claim 11 wherein the water treatment assembly is configured to expose the water to ultraviolet (UV) light radiation.

15. The system of claim 11 wherein the structuring objects are positioned in the tube in an arrangement configured to create a spiral flow of the water in the tube.

16. The system of claim 11 wherein the structuring objects comprise a material including glass and being substantially transparent to transmit light therethrough.

* * * * *